Aug. 27, 1968   C. F. CROWNOVER   3,398,544
SOLIDIFICATION OF ACIDIC COMPONENTS IN NATURAL GAS
Filed July 27, 1966   2 Sheets-Sheet 2

INVENTOR.
CARL F. CROWNOVER
BY
ATTORNEY 2,398,544
Patented Aug. 27, 1968

3,398,544
SOLIDIFICATION OF ACIDIC COMPONENTS
IN NATURAL GAS
Carl F. Crownover, Ponca City, Okla., assignor to Continental Oil Company, Ponca City, Okla., a corporation of Delaware
Filed July 27, 1966, Ser. No. 568,214
6 Claims. (Cl. 62—12)

ABSTRACT OF THE DISCLOSURE

Acidic components such as carbon dioxide or hydrogen sulfide are removed from natural gas by first cooling the gas to form a liquid containing at most about 20 percent of the acidic components in the solid form nucleation sites, and subsequently flashing the mixture to effect freezing of the remaining acidic components.

---

Figure 1:
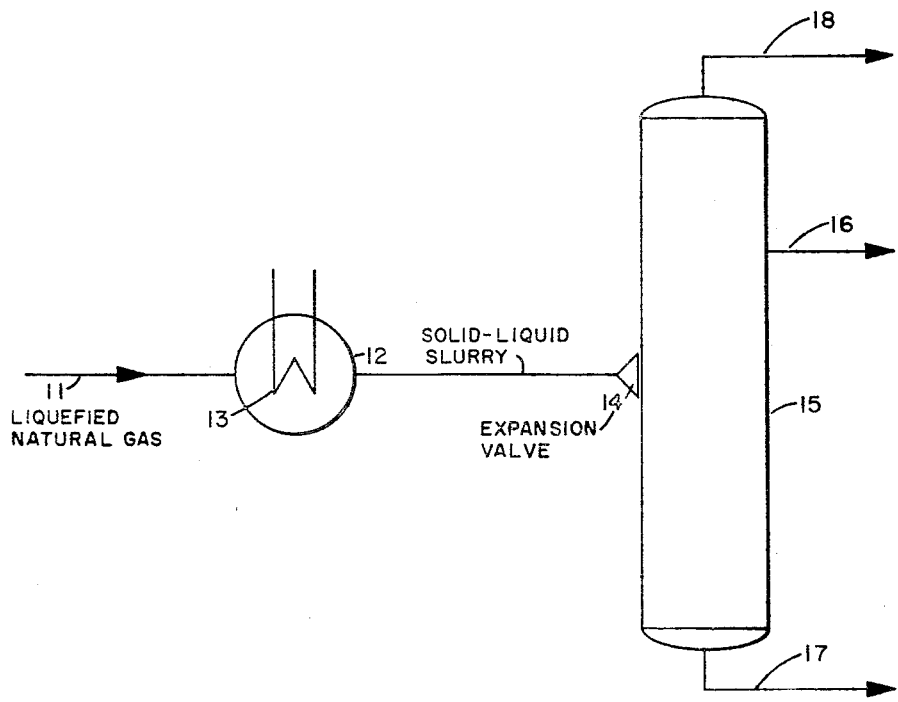

The present invention relates to natural gas processing; and, more particularly, the present invention relates to a method for removing acid gas from admixture with natural gas.

Before natural gas can be utilized, it is quite often necessary to remove various impurities which occur with it. For instance, while natural gas is generally understood to comprise methane with minor amounts of ethane, propane and heavier hydrocarbons, it is common for such so-called "natural gas" to have impurities mixed with it— such as, helium, argon, and the acid gases, hydrogen sulfide and carbon dioxide. These latter materials: that is, the acid gases, are often especially objectionable due to the corrosion problems which can occur as a result of their presence, and also due to the fact that they reduce the B.t.u. content per standard foot of the gas mixture. Thus, it is routinely necessary to remove these acid gases before the natural gas can be distributed and utilized.

A number of methods have been suggested for removing acid gases from admixture with natural gas. Adsorption techniques are commonly utilized for this purpose, and attempts have been made to use low-temperature gas purification processes. In these latter processes, which were pioneered by Fred Kurata, it is general practice to first liquefy the natural gas under conditions of temperature and pressure at which the acid gas impurities are in solution, and thereafter to rapidly decrease the pressure on the liquid gas—i.e., to flash it—whereupon the acid gas components crystallize and form a slurry with the liquid gas with a portion of the natural gas entering the vapour phase.

While an examination of methane-carbon dioxide and methane-hydrogen sulfide phase diagrams indicates that the low-temperature processes are technically feasible, it has nevertheless been found that substantial operating difficulties are encountered in removing the solid acid gas particles from the liquid natural gas once phase differentiation has taken place. Among other reasons for these difficulties is the fact that the crystals of the acid gas which are formed during flashing are so small that they defy normal techniques which are utilized for solid-liquid separation. Until the present invention, a low-temperature gas purification process which results in a solid-liquid slurry capable of being separated with existing equipment has remained an elusive desideratum.

It is, therefore, an object of the present invention to provide an improved method for removing acid gas components from admixture with natural gas.

Another object of the present invention is to provide an improved and practical mehod for removing acid gas components from admixture with natural gas utilizing low-temperature processing techniques.

A further object of the present invention is to provide an improved method for removing acid gas components from admixture with natural gas, utilizing low temperature techniques to produce a relatively easily separated solid-liquid slurry.

An additional object of the present invention is to provide an improved, low-temperature method for removing acid gas components from a liquid natural gas wherein solids of the acid gas which are formed during a flashing step may be easily removed from the natural gas.

Yet another object of the present invention is to provide an improved method for removing carbon dioxide from admixture with natural gas wherein relatively large carbon dioxide particles are formed in a slurry with the liquid natural gas.

Still another object of the present invention is to provide a method for removing carbon dioxide from natural gas wherein relatively large particles of solid carbon dioxide are produced by initiating limited crystallization of carbon dioxide prior to a flashing step.

These and other objects will be accomplished by practicing the present invention, which in one form may comprise the steps of providing a liquefied natural gas stream containing acid gas and initially crystallizing a limited portion of the acid gas in the stream to form a liquid-solid slurry. This slurry is then moved to a decompression zone in which it is flashed to crystallize substantially all of the acid gas which remains in solution after the initial crystallization step. The acid gas crystals may then be removed from the liquid natural gas.

Figure 2:
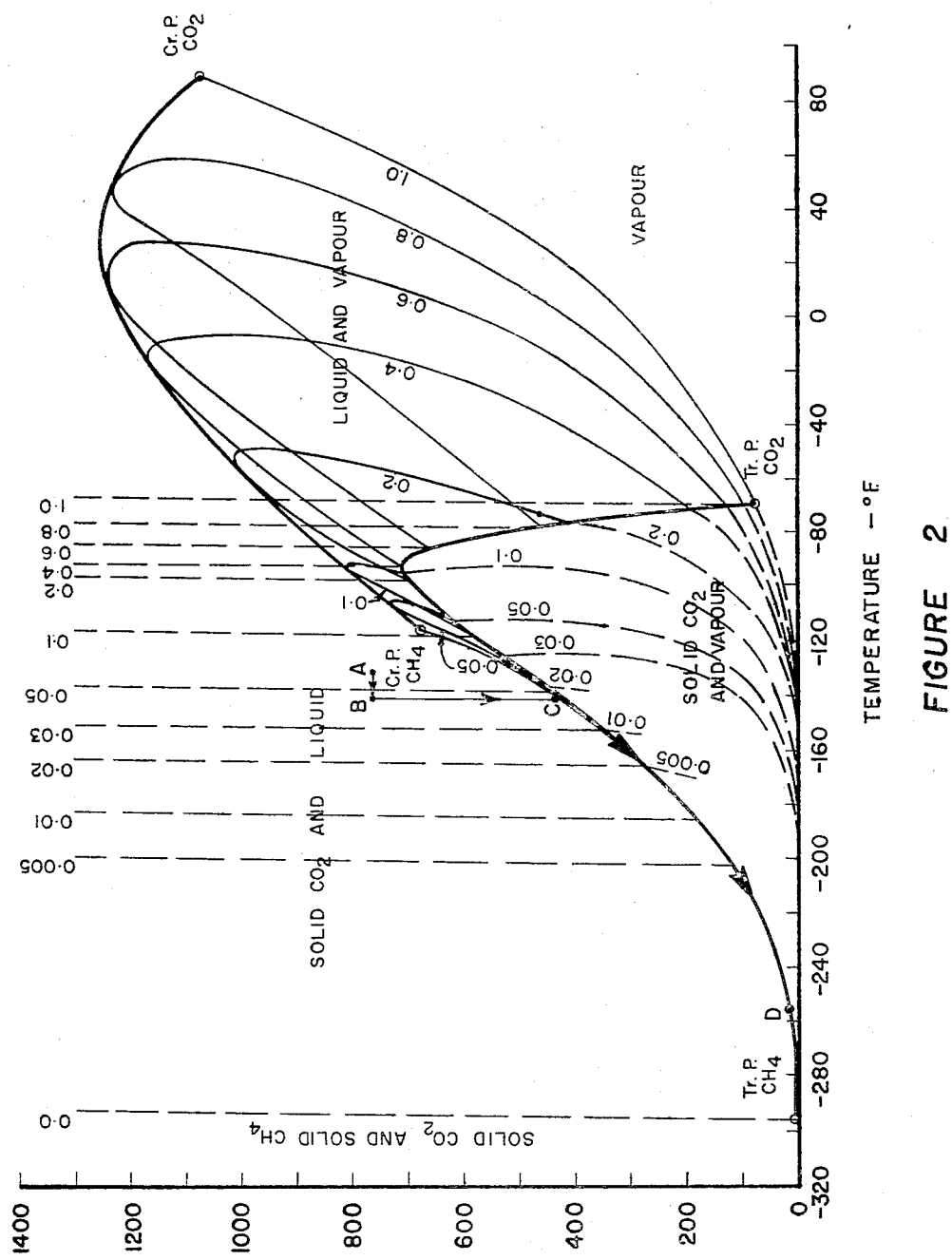

A more complete understanding of the present invention may be obtained from a careful perusal of the following written description in conjunction with an examination of the accompanying drawings wherein:

FIGURE 1 is a schematic flow diagram showing processing equipment useful in practicing the present invention; and FIGURE 2 is a pressure-temperature phase diagram for the methane-carbon dioxide system, having superimposed thereon typical pressure-temperature relationships encountered in practicing the present invention with a liquid-gas mixture of a given composition.

Before considering one or more of the precise methods for practicing the present invention, it is desirable that the principle underlying this invention be repeated and stressed. More particularly, the problem to which this invention is addressed arises from the fact that when a liquid methane-solid acid gas slurry is formed in a cryogenic gas purification process it has been substantially impossible to separate the solid from the liquid in an economic manner due, among other things, to the extremely small size of the solid acid gas particles which are formed. This invention is based on the concept of increasing the size of those acid gas particles to the point at which they may be removed by inertia type segregation equipment— such as, the hydrocyclone. This increase in size is accomplished by initially crystallizing a limited amount of the acid gases to furnish nucleation sites during a flashing step so that the acid gas crystals form around the nucleation sites and thereby become larger than the crystals encountered from a simple one-step expansion process.

One process for practicing this invention may be achieved utilizing the equipment shown in FIGURE 1 wherein an incoming natural gas stream, which is unsaturated with and contains not more than 40 percent or less than .2 percent and preferably not more than 10 percent or less than about 0.5 percent of an acid gas, enters the system via conduit 11. Prior to its introduction into conduit 11, this adulterated natural gas stream will have been liquefied so that the acid gas is present as solute in the methane solvent. A refrigeration chamber, indicated generally at 12, is provided in communication with conduit 11 so that the adulterated liquid natural gas stream flows from conduit 11 into chamber 12 and is therein cooled in a controlled amount by contact with refrigeration coils 13, without a substantial pressure decrease. The amount of cooling desired depends upon the temperature and pressure of the incoming natural gas stream, and the percent of saturation of the acid gas within the stream —that is, the closer the incoming natural gas stream is to being saturated with acid gas, the less will be the amount of cooling necessary. In general it may be stated that it will be necessary to cool, or otherwise manipulate the adulterated natural gas stream a sufficient amount to cause precipitation of from about 0.5 percent to about 20 percent of the acid gases dissolved in the stream and preferably from about 1 percent to about 5 percent.

The acid gases which are precipitated in chamber 12 form a homogeneous dispersion within the liquid natural gas stream and are subsequently moved with the stream through a flashing valve 14. On passing through valve 14, the liquid-solid mixture is, in a preferred embodiment, decompressed to about atmospheric pressure into a liquid-vapor separator 15. During decompression a portion of the methane flashes to the vapour phase, and the temperature of the stream is thereby reduced to cause additional precipitation of acid gas from the liquid methane. As this additional acid gas precipitates, it crystallizes around the nucleation sites furnished by the acid gas particles formed in refrigeration chamber 12 so that the final solid acid gas is composed of relatively large particles which may then be removed by centrifugation or other similar techniques.

Within separator 15 a certain amount of initial settling of the solid acid gas takes place to allow the removal of a solid-free liquid natural gas stream through conduit 16. The solid acid gas is removed in a slurry with liquid natural gas through a conduit 17 for subsequent separation, while some natural gas containing trace amounts of carbon dioxide leaves the system as a vapour through conduit 18.

The previous description has been concerned with a general disclosure of one way in which the present invention may be practiced. To further demonstrate the invention, the following information is presented concerning a laboratory experiment which was conducted to demonstrate the practical feasibility of the concept of the invention. This experiment will be explained hereinafter as it relates to the phase diagram shown in FIGURE 2. More particularly, a liquid natural gas stream containing about 0.05 mole fraction of carbon dioxide at a pressure of 750 p.s.i.a. and at a temperature of $-123°$ F. (point A on the phase diagram) was cooled at constant pressure to $-142°$ F. (point B). Under these conditions of temperature and pressure, the liquid natural gas was saturated at approximately 0.0475 mole fraction carbon dioxide so that approximately 0.0025 mole fraction carbon dioxide crystallized and dispersed within the liquid natural gas stream. This stream was then flashed to 20 p.s.i.a. In the flashing step the pressure dropped to approximately 400 p.s.i.a. (point C) at which time further reduction in pressure resulted in vaporization of portions of the liquid methane and concurrent precipitation of additional amounts of solid carbon dioxide until the pressure reached 20 p.s.i.a. and the temperature was thereby reduced to approximately $-256°$ F. (point D). It was observed that megascopic particles of carbon dioxide were formed which substantially instantaneously settled to the bottom of the liquid natural gas remaining in the system to allow decanting of clear, liquid methane.

These results should be compared with the results of an experiment wherein a liquid natural gas stream which also contained approximately 0.05 mole fraction of carbon dioxide was flashed to atmospheric pressure and a temperature of approximately $-255°$ F. without any prior crystallization of the carbon dioxide within the stream. As a result of this experiment, in which the present invention was not practiced, a liquid natural gas-solid carbon dioxide slurry was obtained as in the prior case. However, the carbon dioxide crystals formed were not megascopic but rather microscopic in size; and, after the resulting slurry was allowed to stand for approximately one hour, no appreciable settling of the solid carbon dioxide within the slurry was observed. It was, therefore, abundantly clear that the utilization of a pre-crystallization step prior to flashing produced a solid liquid slurry which may be relatively easily separated into its solid and liquid components.

It will be understood that changes and embellishments may be made in both the foregoing general and specific descriptions of the invention without departing therefrom. For instance, it may be found desirable to utilize the solid carbon dioxide removed from the system in the initial heat exchange step in chamber 12. In addition, it may be found desirable to obtain the initial limited crystallization by means other than exterior refrigeration: for instance, by controlled limited expansion of the gas stream. In this latter instance, however, it will be found necessary to include some means for eliminating the electrostatic charge which will form on the acid gas particles and which, if allowed to remain, will prevent these particles from effectively acting as nucleation sites in the later flashing step. These and other changes in the details, steps and arrangement of parts which have been herein described and illustrated in order to describe the nature of the invention may be made by those skilled in the art without departing from the spirit and scope of the invention.

What is claimed is:
1. The method of removing acid gases from admixture with liquid natural gas which comprises the steps of:
    (a) reducing the temperature of said liquid natural gas by indirect heat exchange to solidify not more than about 20 percent of said acid gas to form a slurry;
    (b) moving said slurry to a flashing zone; and
    (c) flashing said slurry to a temperature and pressure whereat the remaining acid gas solidifies.
2. The method defined in claim 1 wherein said acid gas is carbon dioxide.
3. The method defined in claim 1 wherein not more than about 5 percent of the carbon dioxide is crystallized in step (b).
4. The method defined in claim 1 wherein the natural gas containing carbon dioxide is liquefied prior to initial crystallization of the acid gas.
5. The method defined in claim 4 wherein said acid gas is carbon dioxide.
6. The method defined in claim 5 wherein not more than about 5 percent of the carbon dioxide is crystallized in step (b).

References Cited

UNITED STATES PATENTS

| | | | |
|---|---|---|---|
| 2,900,797 | 8/1959 | Kurata | 62—12 |
| 2,996,891 | 8/1961 | Tung | 62—12 |
| 3,203,192 | 8/1965 | Tafreshi | 62—12 |
| 3,224,208 | 12/1965 | Schlumberger et al. | 62—23 XR |
| 3,236,057 | 2/1966 | Tafreshi | 62—12 |
| 3,283,521 | 11/1966 | Harmens | 62—12 |
| 3,312,073 | 4/1967 | Jackson et al. | 62—12 XR |

NORMAN YUDKOFF, *Primary Examiner.*

V. W. PRETKA, *Assistant Examiner.*